(12) United States Patent
Uesaka

(10) Patent No.: US 8,186,242 B2
(45) Date of Patent: May 29, 2012

(54) STEERING COLUMN SYSTEM

(75) Inventor: Yota Uesaka, Toyohashi (JP)

(73) Assignee: Fuji Kiko Co., Ltd., Shizuoka (JP)

( * ) Notice: Subject to any disclaimer, the term of this patent is extended or adjusted under 35 U.S.C. 154(b) by 262 days.

(21) Appl. No.: 12/591,770

(22) Filed: Dec. 1, 2009

(65) Prior Publication Data

US 2010/0139439 A1 Jun. 10, 2010

(30) Foreign Application Priority Data

Dec. 5, 2008 (JP) ................. P2008-311170

(51) Int. Cl.
*B62D 1/18* (2006.01)

(52) U.S. Cl. ........................ 74/493; 280/775

(58) Field of Classification Search .............. 74/493; 280/775
See application file for complete search history.

(56) References Cited

U.S. PATENT DOCUMENTS

| | | | |
|---|---|---|---|
| 7,322,608 B2 * | 1/2008 | Yamamoto et al. | 280/775 |
| 7,677,132 B2 * | 3/2010 | Oh | 74/493 |
| 7,770,488 B2 * | 8/2010 | Kim et al. | 74/493 |
| 2006/0028010 A1 * | 2/2006 | Yamada | 280/775 |

FOREIGN PATENT DOCUMENTS

| | | |
|---|---|---|
| JP | 2001-322552 A | 11/2001 |
| JP | 2006-069524 A | 3/2006 |

* cited by examiner

*Primary Examiner* — Justin Krause
(74) *Attorney, Agent, or Firm* — The Nath Law Group; Jerald L. Meyer; Robert T. Burns

(57) ABSTRACT

Paired distance pieces (51, 52) disposed between two sidewall portions (41,42) of a vehicle body-side bracket (4) and an outer tube (31) are separated from each other, and have press protrusions (51*b*,52*b*) protruding from inner side surfaces (51*c,* 52*c*) of the distance pieces (51, 52), respectively, the press protrusions (51*b,*52*b*) configured to be brought into pressure contact with the outer side of an inner tube (32). In addition, abutment portions (51*g,* 52*g*) configured to abut on the outer side of the outer tube (31) are formed in upper ends (51*c,* 52*c*) of the inner side surfaces (51*c,* 52*c*), respectively. Furthermore, a rotation prevention part (9) is provided between a first distance piece (51) and the outer tube (31), and a second distance piece (52) is provided in a manner rotatable relative to the outer tube (31). Thereby, a clamping effect is enhanced while reducing a force needed to operate an operation lever (7), and the vibration characteristic is enhanced.

7 Claims, 4 Drawing Sheets

STEERING COLUMN SYSTEM

BACKGROUND OF THE INVENTION

1. Field of the Invention

The present invention relates to a steering column system which houses a steering shaft with which tilt and telescopic operations of a steering wheel can be performed.

2. Description of the Related Art

Among automobile steering wheels, there is an automobile steering wheel which can be adjusted in upward and downward directions by the tilt operation and adjusted in frontward and backward directions by the telescopic operation so as to suit the driver's physique. The position of the steering wheel which is adjusted in the upward, downward, frontward and backward directions is fixed with a support unit configured to support a steering column housing a steering shaft toward the vehicle body (see Japanese Patent Application Laid-Open No. 2001-322552, for instance).

In this case, the support unit includes: a vehicle body-side bracket and distance pieces (connecting brackets). Here, the vehicle body-side bracket has a cross-section with an upside-down U-shape and is disposed in a way that the steering column is interposed between the two sidewall portions of the vehicle body-side bracket. The distance pieces are disposed between the inner sides of the two sidewall portions and the outer side of an outer tube. In addition, a clamp shaft (bolt) penetrates the two sidewall portions of the vehicle body-side bracket and the distance pieces. A cam part is disposed between the clamp shaft and the outer side of one of the sidewall portions of the vehicle body-side bracket. The cam part includes: a fixed cam member which is stopped from rotating by the vehicle body-side bracket; and a movable cam member which is configured to rotate integrally with an operation lever. The cam part is configured to press the two sidewall portions of the vehicle body-side bracket in such respective directions that the two sidewall portions thereof come closer to each other, or to release the two sidewall portions thereof from the press, when the clamp shaft is rotated due to the operation of the operation lever. Furthermore, the clamping is performed by pressure-contacting the two sidewall portions of the vehicle body-side bracket to the respective distance pieces when the cam part presses the two sidewall portions in such respective directions that the two sidewall portions come closer to each other.

Moreover, a looseness preventing cam configured to rotate integrally with the clamp shaft is provided between the distance pieces. When the cam part presses the two sidewall portions of the vehicle body-side bracket in response to the rotation of the clamp shaft, an eccentric cam protruding from the looseness preventing cam shifts an inner tube of the steering column to one side by pressing the inner tube from one portion (from an upper portion), and brings the inner tube into contact with the inner side of the outer tube.

In such a conventional steering column system, lower end portions of the respective distance pieces are fixed on the outer tube by welding. Here, when the two sidewall portions of the vehicle body-side bracket are pressed in such respective directions that the two sidewall portions come closer to each other, and thereby brought into pressure contact with the respective distance pieces, it is desirable that the pressure contact is achieved through their surface contact from a viewpoint of securing larger rigidity at the time of the pressure contact.

However, the lower end portions of the respective distance pieces are welded to the outer tube. Accordingly, the distance pieces and the outer tube are integrally connected together. For this reason, angles at which the respective distance pieces are attached to the outer tube are apt to change subtly due to thermal strain caused during the welding. This makes it likely that an error may occur in the dimension between an internal width between the two sidewall portions of the vehicle body-side bracket and an external width between the distance pieces.

In a case where the dimensional error occurs between the two sidewall portions of the vehicle body-side bracket and the distance pieces, when the two sidewall portions thereof are brought into pressure contacted with the distance pieces, respectively, the contact therebetween is achieved through partial contact (for instance, line contact) instead of the surface contact. This occurs due to change in a clamping force of the cam part as well. For these reasons, it is impossible to obtain stable clamped state. In addition, the contact rigidity between the vehicle body-side bracket and the distance pieces decreases. As a result, the vehicle body-side bracket and the distance pieces resonate with vibrations which are inputted through the steering channel from the road surface, the motor, and the like.

Moreover, although the eccentric cam of the looseness preventing cam brings the inner tube into pressure contact with the inner side of the outer tube by shifting the inner tube to one side when the two sidewall portions of the vehicle body-side bracket are brought into pressure contact with the respective distance pieces, this mechanism brings about the following problems. Firstly, the support strength of the pressure contact is low, and desirable stable fixing between the inner tube and the outer tube can not be obtained. Secondly, a force needed to operate the operation lever is larger since the looseness preventing cam is operated.

SUMMARY OF THE INVENTION

With these problems taken into consideration, an object of the present invention is to provide a steering column system capable of: enhancing a clamping effect while reducing a force needed to operate the operation lever; enhancing the vibration characteristic; and efficiently transmitting a reaction force of the steering lock to the vehicle body.

According to the first aspect of the present invention, a steering column system including a tubular steering column including an outer tube and an inner tube fitted together in a manner axially movable relative to each other and supported to a vehicle body, the steering column configured to house a steering shaft in a manner that the steering shaft is rotatable and axially movable relative to the steering column, the steering shaft being that with which a tilt operation and a telescopic operation of a steering wheel is performable, includes: a vehicle body-side bracket including two sidewall portions disposed at two sides of the steering column while lying astride of the steering column; paired distance pieces disposed between inner sides of the two sidewall portions of the vehicle body-side bracket and outer sides of the outer tube in a manner movable relative to the vehicle body-side bracket, respectively; a clamp shaft inserted in first insertion holes and second insertion holes, the first insertion holes being provided to the two respective sidewall portions of the vehicle body-side bracket, the second insertion holes being provided in the paired distance pieces at positions opposed to the first insertion holes, respectively; and a lock mechanism disposed on the clamp shaft, the lock mechanism configured to press the two sidewall portions of the vehicle body-side bracket in such directions that the two sidewall portions come closer to each other, and to release the two sidewall portions from the press due to an operation of an operation lever, wherein: the paired distance pieces are to separated from each other, the paired distance pieces have press protrusions protruding from first ends of inner sides of the paired distance pieces, respectively, the press protrusions configured to be brought into pressure contact with an outer side of the inner tube while inserted in loose fitting holes formed in the outer tube, respectively; the paired distance pieces have abutment portions formed in second ends of the inner sides of the paired distance pieces, respectively, the abutment portions configured to abut on the outer side of the outer tube when the two sidewall portions of the vehicle body-side bracket are pressed in such directions that the two sidewall portions come closer to each other; a rotation prevention part configured to prevent relative rotation between the outer tube and a first distance piece of the paired distance pieces is provided therebetween, a second distance piece of the paired distance pieces is provided in a manner rotatable relative to the outer tube.

According to the second aspect of the present invention, the steering column system according to the first aspect is characterized in that the first insertion holes are vertically long holes which extend in their vertical directions about a tilt shaft provided to the steering column, and which thus allow the tilt operation of the steering wheel.

According to the third aspect of the present invention, the steering column according to the first or second aspect is characterized in that the second insertion holes are anteroposteriorly long holes which extend in a center axis direction of the steering column, and which thus allows the telescopic operation of the steering wheel.

According to the fourth aspect of the present invention, the steering column according to any one of the first to third invention is characterized in that a gap is formed between the outer tube and a side portion in the inner side of the second distance piece, the side portion extending between the corresponding abutment portion and the corresponding press protrusion.

According to the first aspect of the invention, once the lock mechanism presses the two sidewall portions of the vehicle body-side bracket in such direction that the two sidewall portions come closer to each other by operating the operation lever, the press protrusions provided in the first ends of the inner sides of the paired distance pieces are brought into pressure contact with the outer side of the inner tube, and the abutment portions formed in the second ends of the inner sides of the paired distance pieces are brought into pressure contact with the outer side of the outer tube, respectively. At this time, because the paired distance pieces are separated from each other, out of the paired distance pieces, the distance piece provided with the rotation prevention part is prevented from rotating relative to the steering column by the rotation prevention part, whereas the other distance piece provided with no rotation prevention part is rotatable relative to the steering column. Accordingly, the angle change caused in the internal width between the two sidewall portions of the vehicle body-side bracket by the clamping operation of the operation lever can be absorbed. Consequently, the paired distance pieces are capable of keeping their surface contact with the sidewall portions of the vehicle body-side bracket, and are capable of ensuring their pressure contact with the outer side of the outer tube.

Moreover, when the two sidewall portions of the vehicle body-side bracket are pressed in such respective directions that the two sidewall portions come closer to each other, the pressing force is transmitted to the paired distance pieces. Thus, the paired distance pieces are pressed inwards in such respective direction that the paired distance pieces come closer to each other. Thereby, the press protrusions provided to the distance pieces are pressed directly to the two sides of the inner tube of the steering column, respectively, and hence bring the inner tube into pressure contact with the inner side of the outer tube. By this, the inner tube can be put in pressure contact with the inner side of the outer tube without a provision of a conventional looseness preventing cam. Accordingly, it is possible to reduce a force needed to operate the operation lever. In addition, because the inner tube is pressed, at least from two points, by the press protrusions of the paired distance pieces, the inner tube can be stably pressed to the inner side of the outer tube. Accordingly, the outer tube and the inner tube can be stably fixed to each other.

Thus, the steering column can be stably clamped down onto the vehicle body through the vehicle body-side bracket as a result of a synergy between the following two points. Firstly, the press protrusions press the inner tube to the outer tube. Secondly, the paired distance pieces are brought into pressure contact with the outer side of the outer tube. Accordingly, it is possible to enhance the clamping effect while reducing a force needed to operate the operation lever.

This makes it possible to secure a stable fixing force for the steering wheel without enhancing precision for each part, and to lessen the decrease of specific frequency. Thereby, it is possible to enhance the vibration characteristic of the steering wheel.

In addition, it is possible to make the first distance piece non-rotatable relative to the steering column by providing the rotation prevention part between the outer tube and the first distance piece out of the paired distance pieces. Accordingly, in the case where the paired distance pieces are separated from each other, it is also possible for the support unit to receive a reaction force which occurs at a steering lock, and to transmit the reaction force to the vehicle body efficiently. Consequently, it is possible to efficiently fix the rotation of the steering wheel.

According to a second aspect of the present invention, the first insertion holes are formed as the vertically long holes which extend in their vertical directions about the tilt shaft provided to the steering column, and which allows the tilt operation of the steering wheel. For this reason, when the lock mechanism releases the two sidewall portions of the vehicle body-side bracket from the pressing, the clamp shaft moves in the vertically long holes. This enables the tilt adjustment of the steering wheel.

According to a third aspect of the present invention, the second insertion holes are formed as the anteroposteriorly long holes which extend in the center axis direction of the steering column, and which allows the telescopic operation of the steering wheel. For this reason, when the lock mechanism releases the two sidewall portions of the vehicle body-side bracket from the pressing, the clamp shaft moves in the anteroposteriorly long holes. This enables the telescopic adjustment of the steering wheel.

According to a fourth aspect of the present invention, the gap is formed between the side portion in the inner side of the second distance piece, the side portion extending between the corresponding abutment portion and the corresponding press protrusion. For this reason, the second distance piece is rotatable relative to the outer tube within an allowance of the gap.

BRIEF DESCRIPTION OF THE
ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
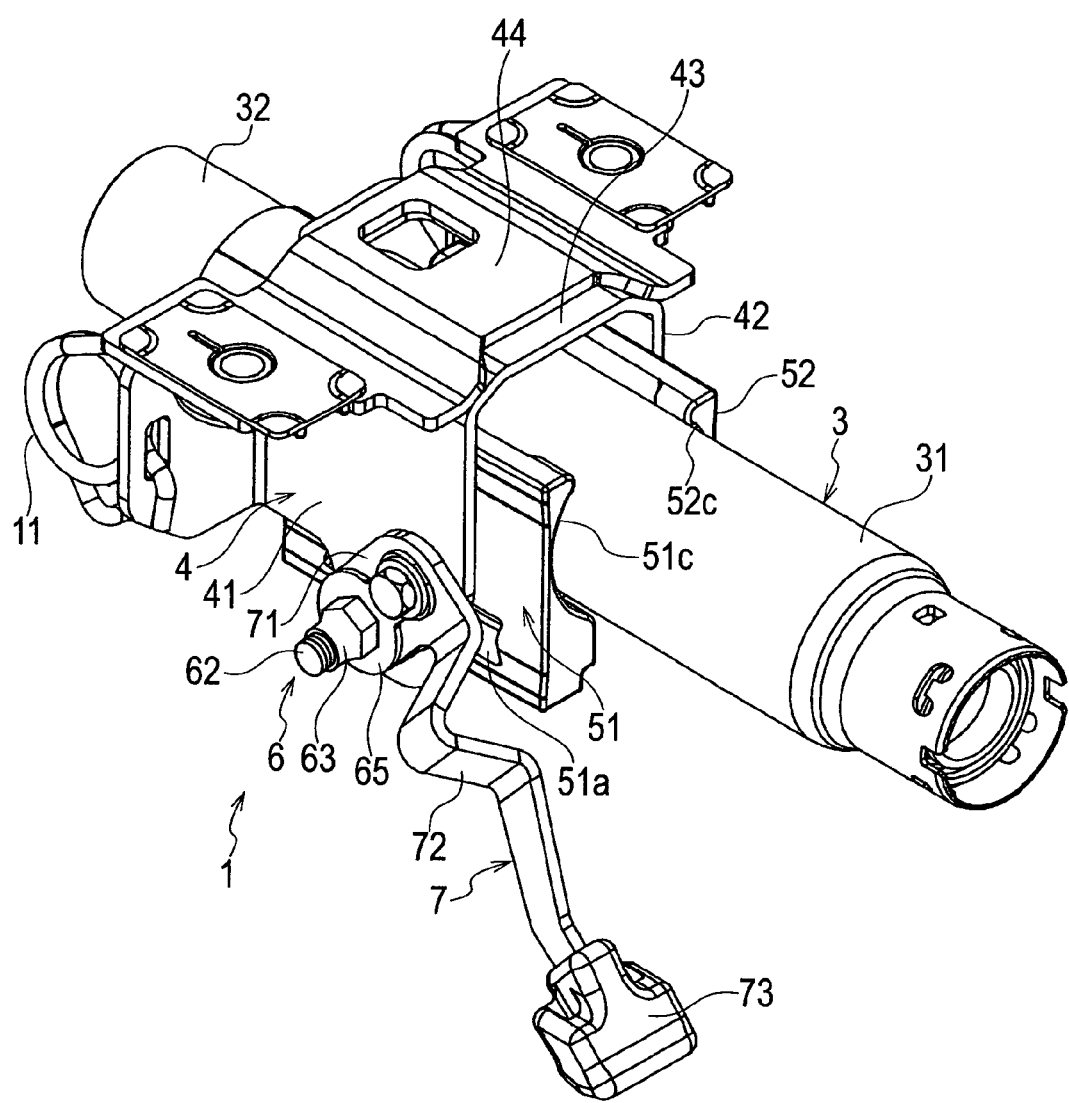
FIG. 1 is a perspective view of a steering column system according to an embodiment of the present invention.

There will be detailed below the preferred embodiments of the present invention with reference to the accompanying drawings. Like members are designated by like reference characters.

Figure 2:
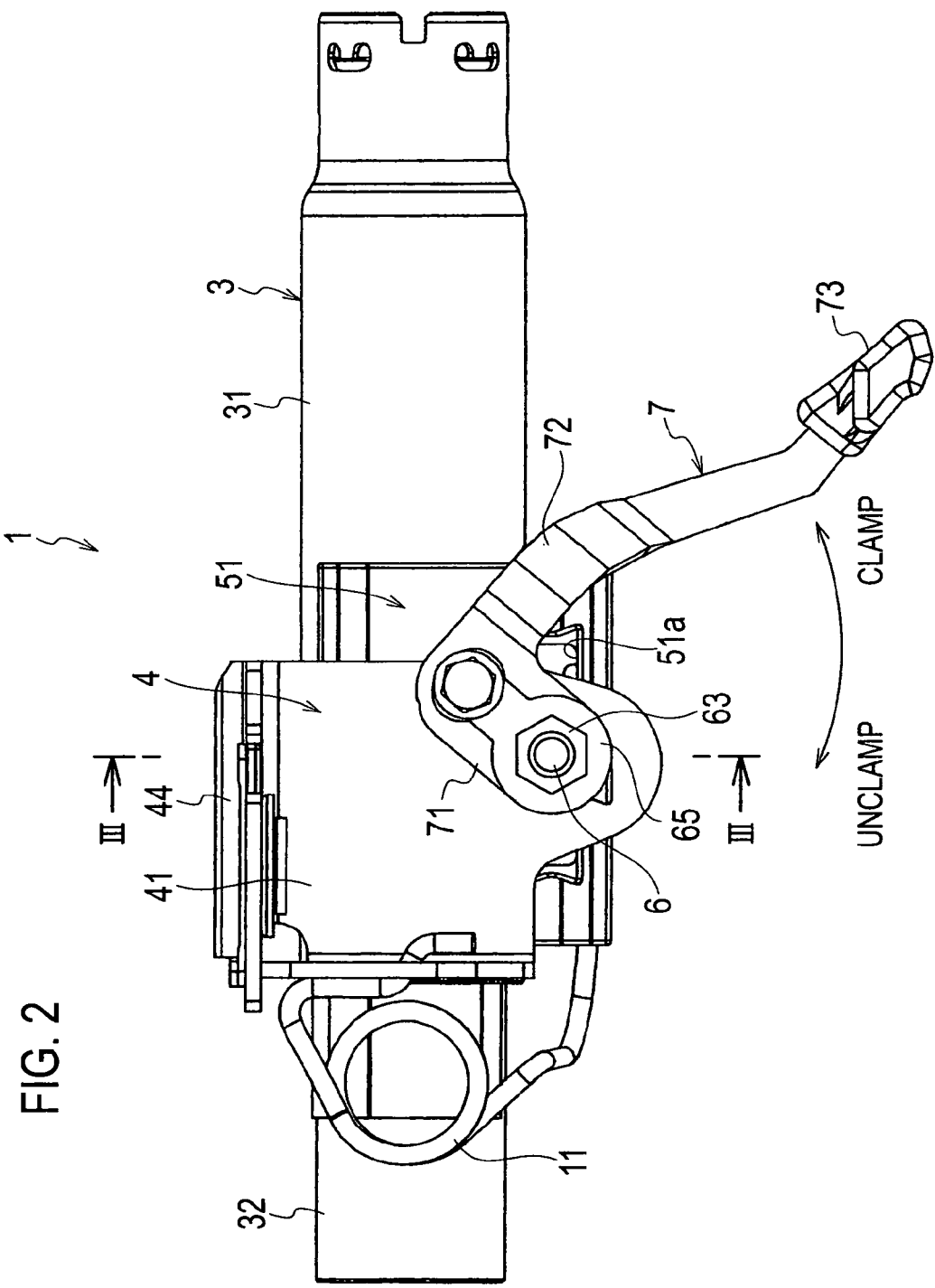
FIG. 2 is a side view of the steering column system according to the embodiment of the present invention, the view viewed from a side of an operation lever.
Figure 3:
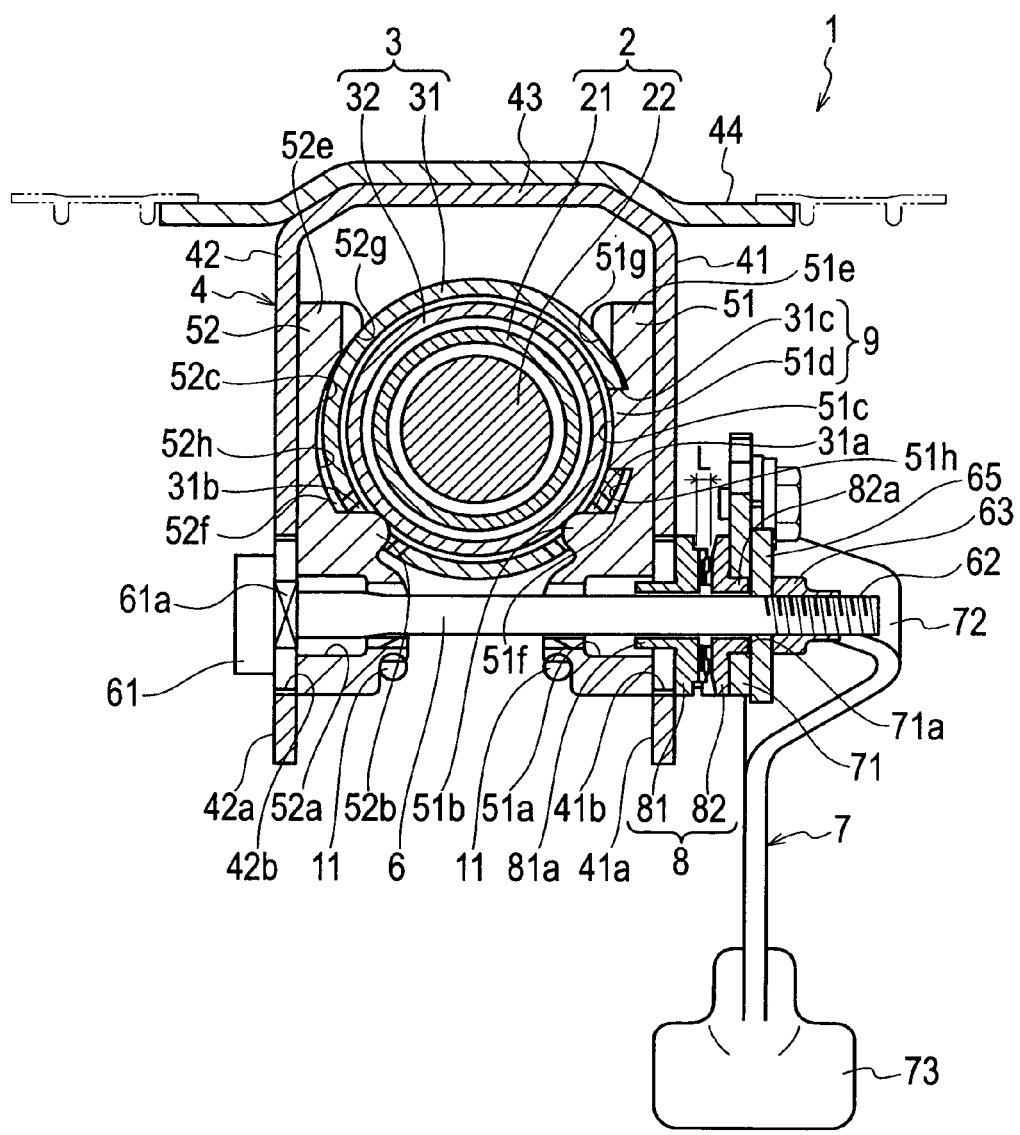
FIG. 3 is a magnified view, cross-sectional view of the steering column system taken along the III-III line of FIG. 2.
Figure 4:
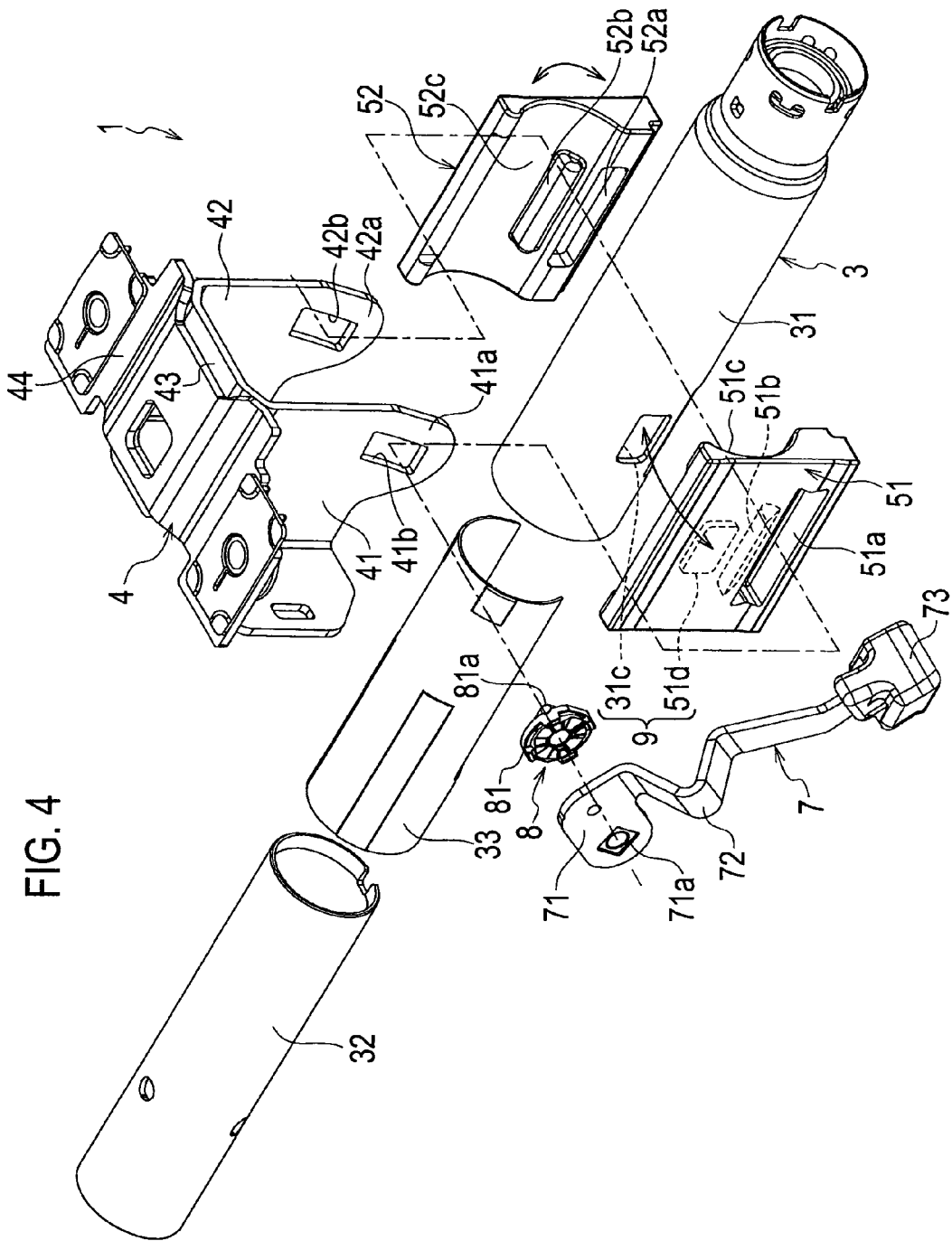
FIG. 4 is an exploded view, perspective view of a chief section of the steering column system according the embodiment of the present invention.

FIGS. 1 to 4 show an embodiment of a steering column system according to the present invention. FIG. 1 shows a perspective view of the steering column system. FIG. 2 is a side view of the steering column system which is viewed from a side of an operation lever. FIG. 3 is a magnified view, cross-sectional view of the steering column system taken along the line of FIG. 2. FIG. 4 is an exploded view, perspective view of a chief section of the steering column system.

In the steering column system 1 of this embodiment, as shown in FIGS. 1 to 4, a steering column 3 configured to house a steering shaft 2 (see FIG. 3) which enables tilt and telescopic operations of a steering wheel (whose illustration is omitted) is supported to a side of a vehicle body. The steering column 3 includes an outer tube 31 and an inner tube 32 which is fitted into the outer tube 31 in a way that the outer tube 31 and the inner tube 32 are movable in their respective axial directions. Portions of the two respective tubes 31, 32 which overlap each other are supported to the side of the vehicle body by a later-described vehicle body-side bracket 4.

The steering column system 1 includes: the vehicle body-side bracket 4 including two sidewall portions 41, 42 which are disposed at the two sides of the overlapping portions while lying astride of the overlapping portions; and paired distance pieces 51, 52 disposed between the inner sides of the two sidewall portions 41, 42 of the vehicle body-side bracket 4 and the outer side of the outer tube 31, respectively, in a way that the distance pieces 51, 52 are movable relative to the vehicle body-side bracket 4.

In addition, the vehicle body-side bracket 4 is provided with vertically long holes (first insertion holes) 41b, 42b in lower end portions 41a, 42a which are portions of the sidewall portions 41, 42 projecting beyond the outer tube 31. Furthermore, the paired distance pieces 51, 52 are provided with anteroposteriorly long holes (second insertion holes) 51a, 52a in their lower end portions which are opposed to the vertically long holes 41b, 42b.

The steering column system 1 further includes: a clamp bolt (clamp shaft) 6 which is inserted in the vertically long holes 41b, 42b and the anteroposteriorly long holes 51a, 52a; and a cam part 8 as a lock mechanism provided to the clamp bolt 6, the cam part 8 being configured to press the two sidewall portions 41, 42 of the vehicle body-side bracket 4 in such respective directions that the two sidewall portions 41, 42 come closer to each other, and to release the two sidewall portions 41, 42 from the pressure by an operation of an operation lever 7. The operation lever 7 is configured by including: an attachment portion 71; an arm portion 72 protruding from this attachment portion 71; and an operation portion 73 provided to an extremity portion of this arm portion 72.

The vertically long holes 41b, 42b extend vertically, like an arc having a large radius of curvature about a later-described tilt shaft provided to the steering column 3, thereby enabling the tilt operation of a steering wheel. In addition, the anteroposteriorly long holes 51a, 52a linearly extend in the same direction as the center axis of the steering column 3 thereby enabling the telescopic operation of the steering wheel.

In the steering column 3, the outer tube 31 is disposed on a rear side in the vehicle where the steering wheel is disposed. The inner tube 32 is disposed on a front side in the vehicle where a steering rack and a front suspension (whose illustrations are omitted) are disposed. A front end portion of the outer tube 31 is fitted around the outer side of a rear end portion of the inner tube 32 in a way that the both tubes are movable relative to each other in their respective axial directions.

An axially lower end portion of the inner tube 32 is connected to the vehicle body with the tilt shaft being interposed in between, the tilt shaft provided to a lower support bracket and omitted from the drawings. Thus, the steering column 3 as a whole is capable of rotating vertically about this tilt shaft.

The steering shaft 2 is configured of an upper shaft 21 and a lower shaft 22. The upper shaft 21 is formed as a tube, and is disposed on the rear side of the vehicle. The steering wheel is attached to a rear end portion of the upper shaft 21. The lower shaft 22 is formed as a solid rod, and is disposed on the front side in the vehicle. A steering gear box is connected to a front end portion of the lower shaft 22 with an unillustrated universal joint being interposed in between. A front end portion of the upper shaft 21 is fitted around a rear end portion of the lower shaft 22 by a spline fitting in a way that the both shafts are movable relative to each other in their respective axial directions.

Accordingly, the telescopic adjustment of the steering wheel is enabled by the axial relative movement of the upper shaft 21 and the lower shaft 22 of the steering shaft 2 and by the axial relative movement of the outer tube 31 and the inner tube 32 of the steering column 3. As shown in FIG. 4, a synthetic-resin guide member 33 is interposed between the fitted portions of the outer tube 31 and the inner tube 32 for enabling the both tubes to smoothly move relative to each other. In addition, the tilt adjustment of the steering wheel is enabled by the vertical rotation of the steering column 3 about the tilt shaft. Note that, in FIG. 4, the clamp bolt 6 is omitted from the drawing, and a later-described movable cam member 82 is attached to an inner side of the operation lever 7 and is thereby hidden. Furthermore, an insertion channel of the clamp bolt 6 is indicated by an alternate long and short dash line in FIG. 4.

The vehicle body-side bracket 4 as a whole is formed in a U-shape placed upside down by connecting the uppermost portions of the two respective sidewall portions 41, 42 by an upper plate 43. The vehicle body-side bracket 4 is connected to an unillustrated steering member on the vehicle body side with a flange 44 interposed in between. The flange 44 is securely installed on the top surface of the upper plate 43.

As shown in FIG. 3, the clamp bolt 6 is provided with a head portion 61 in an end portion thereof, and with a screw portion 62 in the other end portion thereof. The end portion with the screw portion 62 is inserted into the vertically long hole 42b, the anteroposteriorly long hole 52a, the anteroposteriorly long hole 51a, the vertically long hole 41b and an attachment hole 71a formed in the attachment portion 71 of the operation lever 7 in this order.

The head portion 61 and a clamp bolt rotation stopper 61a fittedly inserted in the vertically long hole 42b are formed in an end of the clamp bolt 6. A nut 63 is screwed to the screw portion 62 projecting beyond the sidewall portion 41. Thus, the two sidewall portions 41, 42 of the vehicle body-side bracket 4 and the distance pieces 51, 52 are held between the head portion 61 and the nut 63. In addition, the cam part 8, the operation lever 7 and a washer 65 are provided between the sidewall portion 41 and the nut 63.

The cam part 8 is disposed between the sidewall portion 41 and the operation lever 7. The cam part 8 is configured of: a fixed cam member 81 whose boss 81a is fitted in the vertically long hole 41b in a manner vertically movable, and in the anteroposteriorly long hole 51a in a manner that the rotation of the boss 81a is checked by the anteroposteriorly long hole 51a; and a movable cam member 82 whose boss 82a is fitted in the attachment hole 71a of the operation lever 7 in a manner that the rotation of the boss 82 is checked by the attachment hole 71a of the operation lever 7. A cam body part is formed in surfaces respectively of the fixed cam member 81 and the movable cam member 82 which are opposed to each other. The cam body part is configured to increase or decrease the dimension L between the two cam members 81, 82 in response to the rotational operation of the operation lever 7 in a clamping direction or an unclamping direction, that is, in response to the forward or reverse rotation of the movable cam member 82.

Specifically, when the operation lever 7 is operated to rotate in the clamping direction, which is the counterclockwise direction in FIG. 2, from an unclamped state, the cam part 8 is put into a clamped state where the dimension L between the two cam members 81, 82 is increased. In the clamped state, as shown in FIG. 3, the two sidewall portions 41, 42 are bent in such respective directions that the two sidewall portions 41, 42 come closer to each other. In conjunction with this, the distance pieces 51, 52 move in such respective directions that the distance pieces 51, 52 come closer to each other. At this time, the distance pieces 51, 52 are slightly tiltable toward the clamp bolt 6, because small gaps are formed between the anteroposteriorly long holes 51a, 52a of the distance pieces 51, 52 and the clamp bolt 6.

In addition, as shown in FIG. 2, the steering column system 1 according to the present embodiment is provided with a lifting spring 11 between the vehicle body-side bracket 4 and the lower end portions of the respective distance pieces 51, 52, the lifting spring 11 configured to balance the load of the steering column 3.

In the present embodiment, the paired distance pieces 51, 52 are separated from each other, and press protrusions 51b, 52b are provided in the lowermost ends (first ends) of the opposing surfaces (inner side surfaces 51c, 52c) which are the inner sides of the distance pieces 51, 52, respectively. The press protrusions 51b, 52b are brought into pressure contact with the outer side of the inner tube 32 when the two sidewall portions 41, 42 of the vehicle body-side bracket 4 are pressed in such directions that the two sidewall portions 41, 42 come closer to each other, while being inserted in the loose fitting holes 31a, 31b (see FIG. 3) formed in the outer tube 31. At this time, the press protrusions 51b, 52b are disposed lower than the center of the steering column 3, and abut onto the two respective areas in the lower portion of the inner tube 32. Furthermore, the back faces (outer side surfaces) of the distance pieces 51, 52 are formed substantially flat to be in surface contact with the inner surfaces of the sidewall portions 41, 42 of the vehicle body-side bracket 4.

Arc-shaped abutment portions 51g, 52g are formed in the uppermost ends (second ends) 51e, 52e of the inner side surfaces 51c, 52c being inner sides of the paired distance pieces 51, 52, respectively. The abutment portions 51g, 52g are configured to abut onto the outer side of the outer tube 31 when the two sidewall portions 41, 42 of the vehicle body-side bracket 4 are pressed in such respective directions that the two sidewall portions 41, 42 come closer to each other. Side portions 51h, 52h each shaped like an arc which coincides with the outer shape of the outer tube 31 are located between the abutment portions 51g, 52g and the press protrusions 51b, 52b in the inner surfaces 51c, 52c of the distance pieces 51, 52, respectively. Gaps 51f, 52f are provided between the outer side of the outer tube 31 and the side portions 51h, 52h which are respectively formed between the abutment portions 51g, 52g and the press protrusions 51b, 52b of the inner side surfaces 51c, 52c. Note that, although the side portions 51h, 52h are shaped like the arc which coincide with the outer shape of the outer tube 31 in the present embodiment, the shape thereof may not necessarily be shaped like an arc as long as a gap is formed.

Furthermore, a rotation prevention part 9 for preventing rotation relative to the outer tube 31 is provided between the outer tube 31 and the distance piece (a first distance piece) 51 of the paired distance pieces 51, 52. The other distance piece (a second distance piece) 52 is disposed in a manner rotatable relative to the outer tube 31.

In the present embodiment, the rotation prevention part 9 is configured of: a lock protrusion 51d protruding from an area on the inner side surface 51c of the distance piece 51 which corresponds to the center of the steering column 3; and an engagement opening 31c formed in the outer tube 31, the lock protrusion 51d being tightly fitted into the engagement opening 31c.

In the above configuration, when the operation lever 7 is put in the unclamped state, the operation lever 7 is at a position where it is rotated in the clockwise direction in FIG. 2 (front side in the vehicle). In the unclamped state, the distance L between the fixed cam member 81 and the movable cam member 82 is decreased in the cam part 8, and the internal width between the two sidewall portions 41, 42 of the vehicle body-side bracket 4 is increased. This separates away the distance pieces 51, 52 from each other, and accordingly releases the steering column 3 from the arrested condition.

When the steering wheel is moved upward or downward in this state, the clamp bolt 6 moves upward or downward along the vertically long hole 41b, 42b, and the steering column 3 is rotated about the tilt shaft upward or downward. This enables the tilt adjustment of the steering wheel.

In addition, when the steering wheel is moved frontward or rearward in the state where the steering column 3 is released from the arrested condition, the distance pieces 51, 52 move frontward or rearward, and the anteroposterior length of the steering column 3 concurrently changes with the axial relative movement of each of the outer tube 31 and the inner tube 32 and of the upper shaft 21 and the lower shaft 22. This enables the telescopic adjustment of the steering wheel.

After the tilt and telescopic adjustments of the steering wheel is completed, when the operation lever 7 is rotated in the counterclockwise direction shown in FIG. 2, the distance L between the fixed cam member 81 and the movable cam member 82 is increased in the cam part 8, and the fixed cam member 81 and the head portion 61 of the clamp bolt 6 presses the two sidewall portions 41, 42 of the vehicle body-side bracket 4 in such respective directions that the two sidewall portions 41, 42 come closer to each other as shown in FIG. 3. Thereby, the two sidewall portions 41, 42 are bent in such respective directions that the internal width between the two sidewall portions 41, 42 are decreased, and press and move the distance pieces 51, 52 in such respective directions that the distance pieces 51, 52 come closer to each other. At this time, since the distance piece 52 is rotatable relative to the outer tube 31 within an allowance of the gap 52*f* as shown by an arrow in FIG. 4, the distance piece 52 can relatively rotate along the outer tube 31 while absorbing change in the relative angle between the two sidewall portions 41, 42 of the vehicle body-side bracket 4. Accordingly, the distance pieces 51, 52 are movable while keeping their surface contacts with the two sidewall portions 41, 42 of the vehicle body-side bracket 4.

When the distance pieces 51, 52 are moved closer to each other as above described, the press protrusions 51*b*, 52*b* press the inner tube 32 upwards, and press the inner tube 32 against the upper inner side surface of the outer tube 31. Hence, the distance pieces 51, 52 fix the outer tube 31 and the inner tube 32 to each other by a friction force produced by a pressing force applied to the pressed portion. Thereby, the distance pieces 51, 52 are capable of fixing the axial relative movement between the two tubes 31, 32.

Accordingly, in the steering column system 1 according to the present embodiment, when an operation of the operation lever 7 causes the cam part 8 to press the two sidewall portions 41, 42 of the vehicle body-side bracket 4 in such respective directions that the two sidewall portions 41, 42 come closer to each other, the abutment portions 51*g*, 52*g* formed in the upper ends 51*e*, 52*e* of the inner side surfaces 51*c*, 52*c* of the paired distance pieces 51, 52 are abutted onto and put in pressure contact with the outer side of the outer tube 31. At this time, because the paired distance pieces 51, 52 are separated from each other, out of the paired distance pieces 51, 52, the distance piece 51 provided with the rotation prevention part 9 is prevented from rotating relative to the steering column 3, whereas the other distance piece 52 provided with no rotation prevention part 9 is rotatable relative to the steering column 3 within the allowance of the gap 52*f*. Accordingly, the angle change caused in the internal width between the two sidewall portions 41, 42 of the vehicle body-side bracket 4 by the clamping operation of the operation lever 7 can be absorbed. Consequently, the distance pieces 51, 52 are capable of keeping their surface contact with the two sidewall portions 41, 42 of the vehicle body-side bracket 4, and are capable of ensuring their pressure contact with the outer side of the outer tube 31.

Moreover, when the two sidewall portions 41, 42 of the vehicle body-side bracket 4 are pressed in such respective directions that the two sidewall portions 41, 42 come closer to each other, the pressing force is transmitted to the paired distance pieces 51, 52. Thus, the paired distance pieces 51, 52 are pressed inwards in such respective direction that the paired distance pieces 51, 52 come closer to each other. Thereby, the press protrusions 51*b*, 52*b* provided to the distance pieces 51, 52 are pressed directly to the two sides of the inner tube 32 of the steering column 3, respectively, and hence bring the inner tube 32 into pressure contact with the inner side of the outer tube 31. By this, the inner tube 32 can be put in pressure contact with the inner side of the outer tube 31 without a provision of a conventional looseness preventing cam. Accordingly, it is possible to reduce a force needed to operate the operation lever 7.

In addition, because the inner tube 32 is pressed, at least from two points, by the press protrusions 51*b*, 52*b* of the paired distance pieces 51, 52, the inner tube 32 can be stably pressed to the inner side of the outer tube 31. Accordingly, the outer tube 31 and the inner tube 32 can be stably fixed to each other. At this time, the press protrusions 51*b*, 52*b* are capable of securing larger amounts of pressed movement when the distance pieces 51, 52 are moved closer to each other, because the press protrusions 51*b*, 52*b* are disposed in the lower portions of the distance pieces 51, 52, respectively.

Thus, the steering column 3 can be stably clamped down onto the vehicle body through the vehicle body-side bracket 4 as a result of a synergy between the following two points. Firstly, the press protrusions 51*b*, 52*b* press the inner tube 32 to the outer tube 31. Secondly, the paired distance pieces 51, 52 are brought into pressure contact with the outer side of the outer tube 31. Accordingly, it is possible to enhance the clamping effect while reducing a force needed to operate the operation lever 7.

This makes it possible to secure a stable fixing force for the steering wheel without enhancing precision for each part, and to lessen the decrease of characteristic frequency. Thereby, it is possible to enhance the vibration characteristic of the steering wheel.

In addition, in the present embodiment, it is possible to make the distance piece 51 non-rotatable relative to the steering column 3 by providing the rotation prevention part 9 between the outer tube 31 and the distance piece 51 which is one of the paired distance pieces 51, 52. Accordingly, in the case where the paired distance pieces 51, 52 are separated from each other, it is also possible for the steering column system 1 to receive a reaction force which occurs when the steering wheel is rotated with an anti-theft steering lock being installed in the steering column system 1 and with the steering lock being in operation, and to transmit the reaction force to the vehicle body. Consequently, it is possible to securely fix the rotation of the steering wheel.

Furthermore, in the present embodiment, the vertically long holes 41*b*, 42*b* are formed as the arc-shaped long holes which extend in their vertical directions about the tilt shaft provided to the steering column 3. For this reason, when the cam part 8 releases the two sidewall portions 41, 42 of the vehicle body-side bracket 4 from the pressing, the clamp bolt 6 moves in the vertically long holes 41*b*, 42*b*. This enables the tilt adjustment of the steering wheel.

Moreover, the anteroposteriorly long holes 51*a*, 52*a* are formed as long holes extending in the center axis direction of the steering column 3. For this reason, when the cam part 8 releases the two sidewall portions 41, 42 of the vehicle body-side bracket 4 from the pressing, the distance pieces 51, 52 move. This enables the telescopic adjustment of the steering wheel.

Although the steering column system 1 including the steering column of the present invention has been described by citing the above-described embodiment as its example, the steering column system 1 is not limited thereto. Other various embodiments can be applied to the steering column system 1 within the scope not departing from the gist of the present invention.

For instance, in above-described embodiment, the steering column system 1 is configured to have the two functions as the tilt mechanism and the telescopic mechanism. However, the steering column system 1 may be configured to have only the tilt function by forming the second insertion holes, which are the anteroposteriorly long holes 51*a*, 52*a* in the above embodiment, in a shape of a circle. Otherwise, the steering column system 3 may be configured to have only the telescopic function by forming the first insertion holes, which are the vertically long holes 41*b*, 42*b* in the above embodiment, in a shape of a circle.

Additionally, the distance piece 51 provided with the rotation prevention part 9 may be joined to the outer tube 31 in advance, or the distance piece 51 and the outer tube 31 may be formed integrally.

The entire contents of Japanese Patent Application P2008-311170 (filed on Dec. 5, 2008) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A steering column system comprising a tubular steering column including an outer tube and an inner tube axially movable relative to each other and connecting to a vehicle body, the steering column configured to house a steering shaft in a manner that the steering shaft is rotatable and axially movable relative to the steering column, the steering shaft being tiltable and telescopable, the steering column system further comprising:

a vehicle body-side bracket lying astride of the steering column and including two sidewall portions disposed at two sides of the steering column;

paired distance pieces disposed between inner sides of the two sidewall portions of the vehicle body-side bracket and outer sides of the outer tube in a manner movable relative to the vehicle body-side bracket, respectively;

a clamp shaft inserted in first insertion holes and second insertion holes, the first insertion holes being provided in the two respective sidewall portions of the vehicle body-side bracket, the second insertion holes being provided in the paired distance pieces at positions opposed to the first insertion holes, respectively; and a lock mechanism operably connected to a lever and disposed on the clamp shaft, the lock mechanism configured to press the two sidewall portions of the vehicle body-side bracket in such directions that the two sidewall portions come closer to each other due to a first operation of the lever, and to release the two sidewall portions from the press due to a second operation the lever, wherein:

the paired distance pieces are separated from each other, the paired distance pieces have press protrusions protruding from first ends of inner sides of the paired distance pieces, respectively, the press protrusions configured to be brought into pressure contact with an outer side of the inner tube while inserted in third insertion holes formed in the outer tube, respectively;

the paired distance pieces have abutment portions formed in second ends of the inner sides of the paired distance pieces, respectively, the abutment portions configured to abut on the outer side of the outer tube when the two sidewall portions of the vehicle body-side bracket are pressed in such directions that the two sidewall portions come closer to each other;

a sole rotation prevention part configured to prevent relative rotation between the outer tube and a first distance piece of the paired distance pieces is provided only between the outer tube and a first distance piece; and a gap is provided between the outer side of the outer tube and a side portion formed between the abutment portion and the press portion of an inner side surface of a second distance piece of the paired distances pieces, thereby, the second distance piece of the paired distance pieces is provided in a manner rotatable relative to the outer tube.

2. The steering column system according to claim 1, wherein the first insertion holes extend in a vertical direction about a tilt shaft connecting with the steering column, and are configured to allow a tilt operation of the steering wheel.

3. The steering column system according to claim 2, wherein the second insertion holes extend in a center axis direction of the steering column, and are configured to allow a telescopic operation of the steering wheel.

4. The steering column system according to claim 2, further comprising a gap between the outer tube and a side portion in the inner side of the second distance piece, the side portion extending between the corresponding abutment portion and the corresponding press protrusion.

5. The steering column system according to claim 1, further comprising a gap between the outer tube and a side portion in the inner side of the second distance piece, the side portion extending between the corresponding abutment portion and the corresponding press protrusion.

6. The steering column system according to claim 1, wherein the second insertion holes extend in a center axis direction of the steering column, and are configured to allow a telescopic operation of the steering wheel.

7. The steering column system according to claim 6, further comprising a gap between the outer tube and a side portion in the inner side of the second distance piece, the side portion extending between the corresponding abutment portion and the corresponding press protrusion.

* * * * *